United States Patent [19]

Zwickl

[11] 3,865,417
[45] Feb. 11, 1975

[54] IMPACT ABSORBER FOR BUMPERS
[75] Inventor: Johann Zwickl, Ingolstadt, Germany
[73] Assignee: Volkswagenwerk Aktiengesellschaft, Wolfsburg, Germany
[22] Filed: June 12, 1973
[21] Appl. No.: 368,433

[52] U.S. Cl. .................. 293/88, 293/70, 267/9 C
[51] Int. Cl. ..................... B60r 19/06, F16f 3/08
[58] Field of Search ............ 188/1 C; 267/9 B, 9 C, 267/134, 139, 140, 141; 293/70, 88, 1

[56] References Cited
UNITED STATES PATENTS

| 3,301,335 | 1/1967 | Snelling | 267/141 |
|---|---|---|---|
| 3,371,442 | 3/1968 | Carlson | 267/141 |
| 3,583,530 | 6/1971 | De Venne | 293/70 |
| 3,741,560 | 6/1973 | Schaller | 213/43 |
| 3,747,915 | 7/1973 | Hall | 267/139 |

FOREIGN PATENTS OR APPLICATIONS

| 390,854 | 6/1923 | Germany | 267/9 B |
|---|---|---|---|
| 105,640 | 4/1917 | Great Britain | 267/9 C |

Primary Examiner—Lloyd L. King
Assistant Examiner—Robert Saifer
Attorney, Agent, or Firm—Brumbaugh, Graves, Donohue & Raymond

[57] ABSTRACT

Apparatus for absorbing impact, especially for a vehicle bumper, having two elements, one of which moves toward the other upon impact. This relative movement is controlled by energy dissipating means which simultaneously dissipate impact energy through deformation and friction. The controlled combination of these energy dissipation methods results in a desirably stepped characteristic curve of impact force versus the distance of relative movement of the two elements.

12 Claims, 3 Drawing Figures

IMPACT ABSORBER FOR BUMPERS

BACKGROUND OF THE INVENTION

This invention relates in general to apparatus for absorbing impact, and particularly concerns vehicle bumpers which dissipate impact forces with resultant prevention or reduction of damage to the vehicle. The apparatus also can be used for the protection of stationary objects against impact.

In principle, impact absorbers operate according to a characteristic curve; that is, with a function defining the counteracting force generated, on the compression path, which at the beginning of the impact climbs steeply and then remains constant over a long compression period. In the prior art, where elastomers are used to dissipate impact forces, the characteristic curve does not follow the optimal function to the extent required. Accordingly, practical impact absorbers having more favorable characteristic curves are needed.

SUMMARY OF THE INVENTION

An object of the invention is to provide an impact absorber which operates with an optimal characteristic curve and, in particular, with a stepped characteristic curve. This and other objects are achieved by providing an impact absorber, the elements of which are connected with one component of a friction absorber having two components. One of said components is a friction layer while the other is a pressure plate which abuts the friction layer under pressure, so that when the impact occurs, there is a dissipation of energy through a combination of deformation and friction.

A feature of the impact absorber according to the present invention is the simultaneous application of energy dissipation through deformation and energy dissipation through friction. Accordingly, an integrated structure is created wherein the impact absorber components available for one of the two types of energy conversion are simultaneously operative for the other type. Another feature of the invention is the capability of providing an impact absorber which embodies the advantages of having no sealed connections (as in hydraulic shock absorbers) and practically no aging substances. Accordingly, the impact absorber is virtually maintenance free, and its construction is inexpensive.

In a preferred embodiment of the invention, the frictional energy dissipating means comprises a pressure plate and a friction layer. By appropriately dimensioning these elements it can be ensured that energy dissipation through friction will occur only in the direction of the relative movement between the pressure plate and the friction layer at the time of the impact, whereas friction practically disappears in the case of movement in the opposite direction (as will occur upon restoration of the impact absorber after termination of the shock). As a result the apparatus can be designed practically as a self-restoring device. The elastic body can then regain its shape as a result of the qualities of the elastomer.

One embodiment of the invention is provided with a cylindrical element holding the elastic body and a piston shaped element which is at least partly contained within the cylindrical element. Therefore, this is a telescoping apparatus, wherein the cylindrical element can be lined with a friction layer, and a pressure plate can be provided to receive the piston-type element. If necessary, the pressure plate can consist of the piston-shaped element alone. However, it is advisable to dimension the friction layer and the pressure plate to ensure that friction occurs only during the relative movement caused by an impact and that there is no friction in the opposite direction. This may be achieved by providing a pressure plate which is multi-sectional, so that the pressure plate moves out of frictional contact with the friction layer upon movement of the pressure plate in the direction of self-restoration. This also may be achieved by constructing the apparatus so that the front portion of the piston element abutting the elastic body is carried along a rod wherein the disc-shaped pressure plate is attached to the free end of the rod and the opposite bottom surface of the cylindrical element is attached to the other end of the rod. The rod extends in the direction of the relative motions occurring upon impact between the cylinder element and the piston element.

In the embodiment described above, the structural elements of the impact absorber which are necessary for energy dissipation through friction and for energy dissipation through deformation could be arranged axially, practically next to each other and surrounding each other. In the embodiment as described there is a spatial series connection of the various structural elements. Also in this embodiment, better use can be made of the space if the piston-shaped element is equipped with a cover and an additional deformable elastic unit is incorporated between the pressure plate and the cover which decreases their distance in the event of impact. In this area (that is, inside the piston-shaped element) the structural elements necessary in order to effect energy dissipation through friction and energy dissipation through deformation again surround each other. The additional deformable elastic unit can be made from an elastomer, particularly, one that is less dense than the elastomer used for the friction layer.

There are numerous construction possibilities for building the pressure plate in such a manner that, after an impact force is removed the impact absorber restores itself to its original position. For example, balls or expanding arms could be used. A variant of the invention is characterized in that the pressure plate has parts which cause it to make contact with the friction layer by enabling the plate to expand only when relative motion is created by impact between the pressure plate and the friction layer.

BRIEF DESCRIPTION OF THE DRAWINGS

For a better understanding of the invention, reference may be made to the following description of exemplary embodiments thereof, taken in conjunction with the accompanying drawings, in which.

DESCRIPTION OF THE PREFERRED EMBODIMENTS

Figure 1:
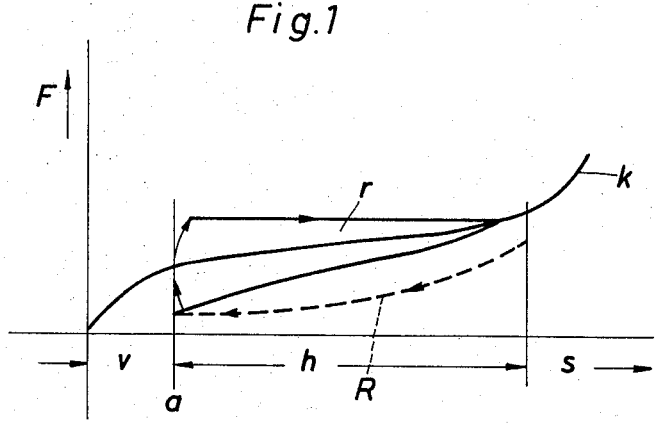
FIG. 1 is a graph illustrating the counteracting force generated by the impact as a function of compression of the impact absorber.

In FIG. 1, the counteracting force generated by the impact absorber is indicated by F, and the decrease in the distance between the two elements caused by the impact (the elastomer being located between these two elements) is indicated by $s$. The characteristic curve for an impact absorber having an elastomer as the only energy dissipating means is indicated by $k$. It is apparent from curve $k$ that even in the event of the onset of an initial force $v$ (that is, a certain compression of the elastic body even before the impact), the desired curved course of the characteristic curve can be achieved only very approximately.

If the elastic element consists of a pre-stressed elastomer, at the moment the impact begins (indicated by $a$) the counteracting force climbs steeply over the value given through the characteristic curve $k$ of the elastomer. In this event, the area $r$ represents the energy lost through friction. In the present invention, suitable design of the impact absorber components responsible for the friction, makes it possible to obtain a horizontal course of the resulting characteristic curve of the apparatus shortly after the impact begins. This control of the characteristic curve is effected by dimensioning the friction layer so that variations in the friction area occur during the relative motion resulting from impact between it and the pressure plate. Similarly, if an elastomer is used for the friction layer (in the interests of efficiency, an elastomer considerably denser than the elastomer forming the elastic body is used), the density of the friction layer can also be varied in the direction of said relative motion so as to obtain a guided frictional portion $r$ and thus a fixed path of the resulting characteristic line of the impact absorber of the present invention.

Also in FIG. 1, R represents the elastic force when the elastic body regains its shape, due to its elasticity, following absorbtion of the impact force.

Figure 2:
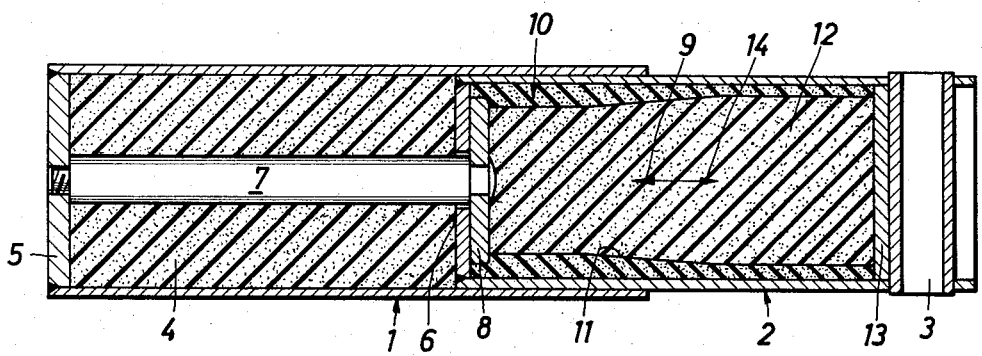
FIG. 2 is a view in longitudinal section of a first exemplary embodiment of the invention.
Figure 3:
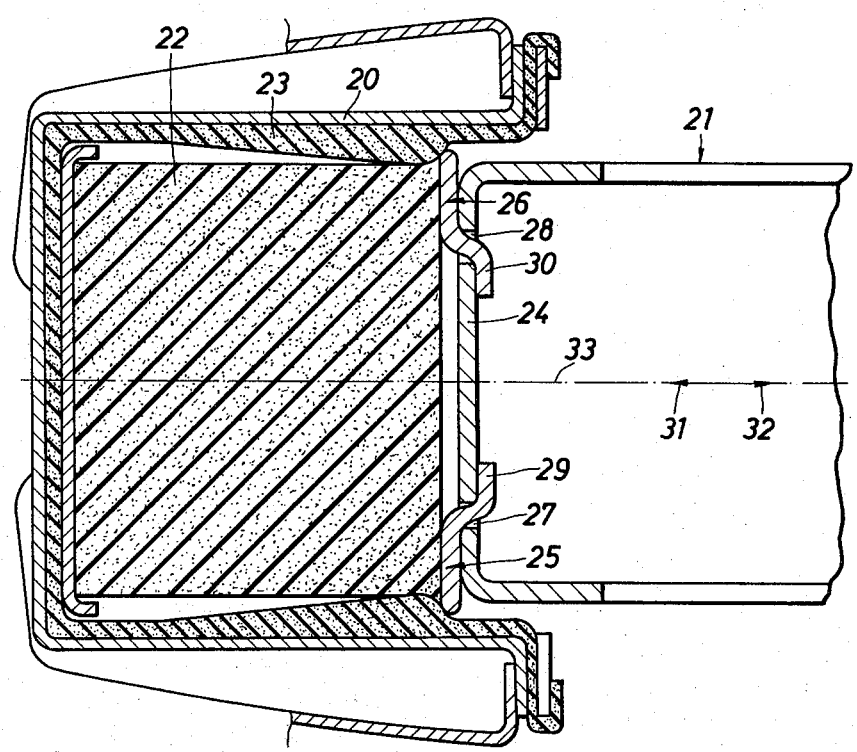
FIG. 3 is a view in longitudinal section of a second exemplary embodiment of the invention.

The longitudinal cross-sections reproduced in FIGS. 2 and 3 depict two embodiments of the invention. Axially symmetrical impact absorbers are used in the cross-section, but this does not mean that the invention is limited to a cross-section of that type. On the contrary, the principle of the present invention can be applied to a multi-angular (particularly a right-angle) section. The impact absorber may also extend for the entire width of a vehicle or the object to be protected. The impact absorbers, and hence also the embodiments shown in the figures, can be utilized in impact absorber arrangements as energy-dissipating supports for push-rods.

Turning now to the FIG. 2 embodiment, the basic external parts of the impact absorber are the cylinder element 1 and the piston-shaped element 2, which are telescoped into each other. The supporting brackets 3 on the piston-shaped element 2 serve to attach it to a push-rod, while the cylindrical element 1 is fastened to a vehicle (not shown).

The cylindrical element 1 accommodates the deformable elastic body 4 (an elastomer). This body is compacted between the bottom 5 of the cylindrical element 1 and the front 6 of the piston-shaped element 2 by means of the rod 7, which is screwed into the bottom 5, and holds the pressure plate 8 immovable and axial. The front 6 of the piston-shaped element 2 rests against the pressure plate 8 under the cushioning effect of the deformable elastic body 4. In the event of an impact, element 2 moves in the direction of the arrow 9, so that the center core of the piston-shaped element 2 with its front 6 is compressed by the pressure plate 8, and compresses the deformable elastic body 4 between it and the cylindrical element 1.

The two frictional energy dissipating components of the apparatus are the disc-shaped pressure plate 8 and the friction layer 10. In this embodiment the latter may also consist of an elastomer, but one that is twice as dense as the material used for the deformable elastic body 4. In the event of an impact the friction layer 10, together with its friction surface 11, slides in the direction of the arrow 9 over the disc-shaped pressure plate 8. Pressure plate 8 is shaped so that in combination with the inner surface of the piston-shaped element 2 it forms a kind of nozzle bell pipe for the material of the friction layer 10. The result is friction and, accordingly, a dissipation of energy through friction. The amount of friction depends on the course taken by the piston-shaped element along the varying thickness of the portion of the friction layer which is positioned under the area covered by the pressure plate 8. As is shown by FIG. 2, the thickness (and hence the frictional power) is greatest at the beginning of impact, and minimal toward the end of the impact. The result is an adaptation to the course ($k$ in FIG. 1) of the counteracting force F created by the deformable elastic body 4 in such manner that a steep climb of the counteracting force F at beginning is assured, while in the later stage of the impact the counteracting force remains practically constant.

Instead of using this type of varying thickness of the friction layer 10, the same effect can also be obtained by providing a constant thickness in a peripheral direction from the area that has no friction layer. If necessary both types could be combined.

FIG. 2, illustrates a spatial series connection of elements creating the counteracting force through deformation and counteracting force through friction. An additional deformable elastic body 12 may be provided for better use of the space. It is positioned inside the piston-shaped element 2. To provide for deformation of this additional body 12, the piston-shaped element 2 is closed by the cover plate 13, so that in the event of an impact the distance between the pressure plate 8 and the cover plate 13 is narrowed and the additional body 12 is thereby compressed.

Once the shock ends, the piston-shaped element is restored to its original position by moving in the direction of the arrow 14. Such restoration is primarily effected through the cushioning effect of the elastomer used for the elastic bodies 4 and 12.

In the embodiment shown in FIG. 3, there is again a telescoping arrangement of a cylindrical element 20 and a piston-shaped element 21. Here again the cylindrical element 20 contains a deformable elastic body 22 consisting of an elastomer (intended herein to mean an elastic, compressible body) such as a polyurethane foam. The same material can be used for the friction layer.

While the FIG. 2 embodiment has a series connection spatially present, the embodiment of FIG. 3 comprises a friction layer 23 which is a lining of the cylindrical element 20, and the pressure plate comprises the front wall 24 of the piston-shaped element 21, which simultaneously serves for the compression of the body 22. In the FIG. 3 embodiment, the pressure plate is constructed in several parts; namely, it is provided with parts 25 and 26, which are inserted in recesses 27 and 28 in the front wall 24 by means of hook-shaped extensions 29 and 30. When the piston-shaped element 21 moves in the direction of the arrow 31 (that is, in response to a shock), parts 25 and 26 assume the position shown, so that they are extended and work together with the friction layer 23. When the apparatus returns to its original position after the impact (that is, when the piston-shaped element 21 moves in the direction of the arrow 32), parts 25 and 26 assume positions essentially running perpendicular to front wall 24 and lying practically parallel to the axis 33. Accordingly, no friction is produced on or in friction layer 23. This arrangement is therefore self-restoring after a force of impact has been removed.

A suitable elastomer deformable elastic body is an elastomer of approximately 0.5 g/cm$^3$; one approximately twice as dense can be used for the friction layer.

Although the invention has been described with reference to specific embodiments thereof, many modifications and variations of such embodiments may be made by those skilled in the art without departing from the inventive concepts disclosed. Accordingly, all such modifications and variations are intended to be included within the spirit and scope of the appended claims.

I claim:

1. An impact absorber for a vehicle bumper comprising, in combination:
   a. first energy absorbing means including a first elastomer and having two ends, said first energy absorbing means being arranged in said impact absorber to dissipate energy caused by deformation of said first elastomer upon relative movement of said two ends; and
   b. second energy absorbing means arranged in said impact absorber to dissipate energy caused by friction upon relative movement of said two ends, said second energy absorbing means including:
      1. a pressure plate connected to one of said ends of said first energy absorbing means; and
      2. a friction layer, comprising a second elastomer of greater density than said first elastomer, connected to the other of said ends and arranged to frictionally coact with said pressure plate upon relative movement of said two ends,
   whereby, upon impact, said impact absorber dissipates energy through a combination of deformation and friction.

2. Impact absorber according to claim 1, wherein said first elastomer of the first energy absorbing means in somewhat compacted when said impact absorber is in the rest position.

3. Impact absorber according to claim 1, wherein the size of the friction area formed by said friction layer differs along the direction of the relative movement between said pressure plate and said friction layer.

4. Impact absorber according to claim 1, wherein the thickness of said friction layer differs along the direction of the relative movement between said pressure plate and said friction layer.

5. Impact absorber according to claim 1, wherein said first energy absorbing means is arranged in a cylinder in the path of a piston whereby said piston compresses said first energy absorbing means within said cylinder upon impact.

6. Impact absorber according to claim 5, wherein said cylinder is lined with said friction layer and said pressure plate includes said piston.

7. An impact absorber for a vehicle bumper comprising, in combination:
   a. first energy absorbing means having two ends and arranged in said impact absorber to dissipate energy caused by deformation upon relative movement of said two ends, said first energy absorbing means being arranged in a cylinder in the path of a piston whereby said piston compresses said first energy absorbing means within said cylinder upon impact; and
   b. second energy absorbing means arranged in said impact absorber to dissipate energy caused by friction upon relative movement of said two ends, said second energy absorbing means including:
      1. a pressure plate connected to one of said ends of said first absorbing means; and
      2. a friction layer connected to the other of said ends and arranged to frictionally coact with said pressure plate upon relative movement of said two ends,
   wherein the front portion of said piston abutting said first energy absorbing means is provided with a hole which slidingly engages a rod, wherein one end of said rod is fastened to said pressure plate and the other end of said rod is fastened to the opposite bottom surface of said cylinder, said rod extending in the direction of the relative motion, which occurs upon impact, between said opposite bottom surface and said front portion, and wherein said piston is interiorly lined with said friction layer,
   whereby, upon impact, said impact absorber dissipates energy through a combination of deformation and friction.

8. Impact absorber according to claim 7, wherein said piston is enclosed and an additional first energy absorbing means is included in the path of said pressure plate whereby it is compressed by said pressure plate in the event of impact.

9. Impact absorber according to claim 8, wherein said additional first energy absorbing means includes an elastomer.

10. Impact absorber according to claim 9, wherein the elastomer used for said friction layer is denser than the elastomer used for said additional first energy absorbing means.

11. An impact absorber for a vehicle bumper comprising, in combination:
   a. first energy absorbing means having two ends and arranged in said impact absorber to dissipate energy caused by deformation upon relative movement of said two ends; and
   b. second energy absorbing means arranged in said impact absorber to dissipate energy caused by friction upon relative movement of said two ends, said second energy absorbing means including:
      1. a pressure plate connected to one of said ends of said first absorbing means; and
      2. a friction layer connected to the other of said ends and arranged to frictionally coact with said pressure plate upon relative movement of said two ends,
   said pressure plate being provided with two edge elements which are foldable in one direction, so that the return of the impact absorber to its original shape after impact is substantially frictionless, whereby, upon impact, said impact absorber dissipates energy through a combination of deformation and friction.

12. Impact absorber according to claim 11, wherein beyond a stop point said edge elements are not foldable beyond a stop point in the direction of impact whereby said edge elements make contact with the friction layer when relative movements occur as the result of an impact.

* * * * *

UNITED STATES PATENT OFFICE
CERTIFICATE OF CORRECTION

PATENT NO. : 3,865,417

DATED : February 11, 1975

INVENTOR(S) : Johann Zwickl

It is certified that error appears in the above-identified patent and that said Letters Patent are hereby corrected as shown below:

Col. 3, line 42, "to" should read --in--;

Col. 5, line 50, "in" should read --is--;

Signed and sealed this 24th day of June 1975.

(SEAL)
Attest:

RUTH C. MASON
Attesting Officer

C. MARSHALL DANN
Commissioner of Patents
and Trademarks